United States Patent
Canter et al.

(10) Patent No.: US 10,438,433 B2
(45) Date of Patent: Oct. 8, 2019

(54) SYSTEM AND METHOD FOR ELECTRONIC VOTING NETWORK HAVING PHYSICAL PORT BLOCKERS

(71) Applicant: Hart InterCivic Inc., Austin, TX (US)

(72) Inventors: James M. Canter, Austin, TX (US); Denton L. Simpson, Round Rock, TX (US); Edward P. Perez, Austin, TX (US)

(73) Assignee: Hart InterCivic, Inc., Austin, TX (US)

( * ) Notice: Subject to any disclaimer, the term of this patent is extended or adjusted under 35 U.S.C. 154(b) by 636 days.

(21) Appl. No.: 15/229,326

(22) Filed: Aug. 5, 2016

(65) Prior Publication Data

US 2018/0005475 A1 Jan. 4, 2018

Related U.S. Application Data

(60) Provisional application No. 62/356,676, filed on Jun. 30, 2016.

(51) Int. Cl.
| | |
|---|---|
| *G06K 17/00* | (2006.01) |
| *G07C 13/00* | (2006.01) |
| *H04L 12/24* | (2006.01) |
| *H04L 12/18* | (2006.01) |

(52) U.S. Cl.
CPC .......... *G07C 13/00* (2013.01); *H04L 12/1895* (2013.01); *H04L 41/22* (2013.01)

(58) Field of Classification Search
CPC ...... G07C 13/00; H04L 12/1895; H04L 41/22
USPC ....................................................... 235/386
See application file for complete search history.

(56) References Cited

U.S. PATENT DOCUMENTS

| | | | |
|---|---|---|---|
| 5,169,332 A | 12/1992 | Cooke et al. | |
| 5,622,064 A | 4/1997 | Gluskoter et al. | |
| 7,083,438 B2 | 8/2006 | Massaro et al. | |
| 7,530,824 B2 | 5/2009 | Bolain | |
| 8,449,309 B1 | 5/2013 | Mosholder | |
| 8,876,002 B2 | 11/2014 | Arnao et al. | |
| 2013/0276374 A1* | 10/2013 | Hsu ...................... G06F 1/1633 | |
| | | | 49/452 |
| 2015/0020189 A1 | 1/2015 | Soffer | |

OTHER PUBLICATIONS

Hart InterCivic, "Verity Touch Writer Ballot Marketing Device Brochure", 2014, 2 pgs.

(Continued)

*Primary Examiner* — Karl D Frech
(74) *Attorney, Agent, or Firm* — Egan Peterman Enders Huston

(57) ABSTRACT

A local electronic voting network configured as a daisy chain network is provided. Each network device may include a switch for routing and propagating voting network communications. A TCP/IP protocol over Ethernet based connections may be used. Voting devices may include a relay configured such that in case of power down of a voting device the relay shunts the communications down the network. Multiple input/output ports may be provided on network devices and a physical port blocker is provided to block unused ports. A network controller may include a display screen which utilizes a graphical user interface to display status information regarding individual ones of the voting devices that are coupled to the voting network.

24 Claims, 13 Drawing Sheets

(56) References Cited

OTHER PUBLICATIONS

Hart InterCivic, "Port Blocking Mechanism From the Verity Touch Writer", publically available more than 1 year before Aug. 5, 2016, 1 page.
"USB Port Lock Developed by NSA PadJack USB Port Lock Secure Vulnerable Ports", Copyright 2015, printed from the Internet Dec. 1, 2016, 4 pgs.

* cited by examiner

SYSTEM AND METHOD FOR ELECTRONIC VOTING NETWORK HAVING PHYSICAL PORT BLOCKERS

This application claims priority to Provisional Patent Application No. 62/356,676 filed Jun. 30, 2016, the disclosure of which is expressly incorporated herein by reference.

BACKGROUND OF THE INVENTION

The present disclosure relates to the voting systems for elections. More specifically, it provides a system and method for providing network control of a direct recording electric voting network.

A variety of electronic voting systems are well known. For example, a variety of paper ballot systems have long existed. As voting technology has improved over time, electronic voting systems have become a preferred voting mechanism. Direct recording electronic (DRE) voting systems are electronic voting systems that record electronic votes directly. For at least some of these electronic voting systems, locally networked voting systems have become popular. In some embodiments of networked voting systems, votes may be cast on multiple voting terminals and then accumulated on one or more other networked controller devices.

Traditionally, local voting networks have been implementing as RS-485 based networks. In its most basic form, RS-485 based voting networks are configured as a series of network nodes, with each node connected in line in series to the next. The RS-485 network operates in a master/slave arrangement with the network controller operating as the master device and the voting terminals being slave devices. Standard RS-485 schemes may be utilized to connect the networked voting terminals in this serial based bus protocol. Thus, the voting network controller operates at the head of the serial daisy chain with a plurality of voting terminals connected in series down the chain, communicating via the RS-485 standard. It would be desirable to provide an improved local network for electronic voting.

SUMMARY OF THE INVENTION

The present disclosure provides, in one embodiment, a local electronic voting network configured as a daisy chain network having a TCP/IP protocol over Ethernet based connections. An on-board Ethernet switch may be provided at each network node, including within the network controller and each voting terminal. The use of switches throughout the chain allows for improved signal quality and strength. In addition to a switch, at least some of the nodes, for example voting terminals, may include a relay. The relay may be configured such that in case of power down of a node (and/or the node's switch) the relay shunts the Ethernet signal down the network. In this manner, power down, malfunction, interruption, etc. of a particular node does not affect downstream devices.

In another embodiment, the present disclosure provides an input/output port blocker. The port blocker may be comprised of two moveable doors which selectively block one or two input/output ports in a secure manner. The two moveable doors may be coupled to each other such that movement of the first door imparts movement to the second door. The second door may be selectively decoupled from the first door so that the second door may move independent of the first door.

In yet another embodiment, the present disclosure provides a graphical user interface for use with a network controller. The graphical user interface may be used to display icons which are indicative of the status of various voting devices coupled to the voting network controlled by the network controller. The icons may display multiple levels of information regarding the status of individual voting devices, include (1) the presence of a voting device, (2) whether a voting device is initializing, ready for use or in use and/or (3) any high importance messages regarding a voting device such as error alerts, voting device disconnection or help requests.

In one embodiment, an election voting system network is provided. The election voting system network may comprise a plurality of voting devices, the voting devices being network connectable and being configured to process a voter's ballot selections; a voting network controller, the controller network being connectable to at least one of the plurality of voting devices, the voting network controller providing control over the plurality of voting devices; and a communication network coupling the voting devices and the network controller, the communication network being configured as a serial daisy chain connection of the voting network controller and the plurality of voting devices. Further, at least two of the plurality of voting devices each contain at least one multi-port switch, the multi-port switch routing and propagating network communications among the voting devices of the voting system network according a network address scheme. The multi-port switch receives network communications on at least a first port, for network communications intended for another of the plurality of voting devices the multi-port switch retransmitting through a second port network communications to a next voting device in the serial daisy chain connections of the plurality of voting devices.

In another embodiment, an election voting system network is provided. The election voting system network comprises a plurality of voting devices, the voting devices being network connectable and being configured to process a voter's ballot selections; a voting network controller, the controller network being connectable to at least one of the plurality of voting devices, the voting network controller providing control over the plurality of voting devices; and a communication network coupling the voting devices and the network controller, the communication network being configured as a serial daisy chain connection of the voting network controller and the plurality of voting devices. Further, at least two of the plurality of voting devices each include a relay, the relay shunting network communications received by a first voting device of the plurality of voting devices, the shunted network communications being provided to a second voting device of the plurality of voting devices, the shunted communications being shunted even when the first voting network device is not powered.

In another embodiment, an election voting system network device is provided. The election voting system network device comprises a plurality of network connectors, the network connectors providing a connection point for connecting the voting system network device to a voting network; a relay, the relay coupled to at least two of the plurality of network connectors; and a multi-port switch, the multi-port switch having at least one port coupled to each of the plurality of network connectors and another port coupled to processing circuitry of the voting system network device, the multi-port switch configured to allow routing and propagating network communications amongst other voting devices according a network address scheme, the multi-port switch configured to receive network communications on at least a first port, for network communications intended for other voting devices the switch retransmitting the network communications through a second port. Further, the relay is configured to pass network communications between the network connectors and the multi-port switch in a normal mode of operation and being configured to shunt network communications between at least two of the plurality of network connectors in a manner that bypasses the multi-port switch in a bypass mode of operation.

In another embodiment, a method of configuring a network connected election voting system comprises providing a plurality of voting devices, the voting devices being network connectable and being configured to process a voter's ballot selections; and providing a voting network controller, the controller network being connectable to at least one of the plurality of voting devices, the voting network controller providing control over the plurality of voting devices. The method further comprises configuring the plurality of voting devices and the voting network controller to communicate over a communication network, the communication network being configured as serial daisy chain connections of the voting network controller and the plurality of voting devices; and configuring at least some of the plurality of voting devices to communicate with each other through the use of multi-port switches within each of the at least some of the plurality of voting devices, the, the multi-port switches routing and propagating network communications among the plurality of voting devices of the voting system network according a network address scheme, each of the multi-port switches receiving network communications on at least a first port, for network communications intended for another of the plurality of voting devices the multi-port switch retransmitting through a second port network communications to a next voting device in the serial daisy chain connections of the plurality of voting devices.

In yet another embodiment, an election voting system network device is provided. The election voting system network device comprises a first input/output port, the first input/output port providing a physical connection point for the election voting system network device configured to receive voting network communications; and a second input/output port, the first input/output port providing a physical connection point for the election voting system network device configured to receive voting network communications. The election voting system network device further comprises a first movable door, the first movable door having at least two positions, in a first position of the first movable door the first movable door blocking the first input/output port and the second input/output port, and in a second position of the first moveable door the first sliding door capable of unblocking at least the first input/output port; and a second movable door, the second movable door having at least two positions, in a first position of the second movable door the second movable door blocking access to the second input/output port and in a second position of the second movable door the second movable door unblocking at least the second input/output port. Further, the second movable door is configured to be movable as a result of movement of the first movable door, the second movable door being movable between the first position of the second movable door and the second position of the second movable door while the first movable door is in the second position of the first movable door.

In yet another embodiment, an election voting system port blocker is provided. The election voting system port blocker comprises a first sliding door configured to provide selective access to a first input/output port and a second input/output port, in a first position of the first sliding door the first sliding door blocking access to both the first input/output port and the second input/output port and in a second position of the first sliding door the first sliding door unblocking the first input/output port; and a second sliding door configured to provide selective access to the second input/output port, in a first position of the second sliding door the second sliding door blocking access to the second input/output port and in a second position of the second sliding door the second sliding door unblocking the second input/output port. Further, the second sliding door is configured to be selectively coupled to the first sliding door such that, when coupled, movement of the first sliding door causes movement of the second sliding door. In addition, the first sliding door and the second sliding door may be selectively moved to a variety of positions that selectively (1) block both the first input/output port and the second input/output port, (2) block one of the first input/output port or the second input/output port, or (3) unblock both the first input/output port and the second input/output port.

In yet another embodiment, an election voting system network is provided. The election voting system network comprises a plurality of voting devices, the voting devices being network connectable and being configured to process a voter's ballot selections, at least one of the plurality of voting devices having two input/output ports; a voting network controller, the controller network being connectable to at least one of the plurality of voting devices, the voting network controller providing control over the plurality of voting devices; and a communication network coupling the voting devices and the network controller, the communication network being configured as a serial daisy chain connection of the voting network controller and the plurality of voting devices. The election voting system network further comprises a port blocker assembly coupled to at least one of the plurality of voting devices having two input/output ports. The port blocker assembly comprises a first sliding door configured to provide selective access to a first input/output port and a second input/output port, in a first position of the first sliding door the first sliding door blocking access to both the first input/output port and the second input/output port and in a second position of the first sliding door the first sliding door unblocking the first input/output port; and a second sliding door configured to provide selective access to the second input/output port, in a first position of the second sliding door the second sliding door blocking access to the second input/output port and in a second position of the second sliding door the second sliding door unblocking the second input/output port. Further, the second sliding door is configured to be selectively coupled to the first sliding door such that, when coupled, movement of the first sliding door causes movement of the second sliding door.

In another embodiment, a networked election voting system is provided. The networked election voting system comprises a plurality of voting devices, the voting devices being network connectable and being configured to process a voter's ballot selections; a voting network controller, the controller network being connectable to at least one of the plurality of voting devices, the voting network controller providing control over the plurality of voting devices; and a communication network coupling the voting devices and the network controller. The networked election voting system further comprises a voting network controller display screen including a graphical user interface; and a plurality of icons presentable on the graphical user interface, individual icons of the plurality of icons representative of status information of individual ones of the plurality of voting devices.

In another embodiment, a method of monitoring a networked election voting system, comprises providing a plurality of voting devices, the voting devices being network connectable and being configured to process a voter's ballot selections; and providing a voting network controller, the controller network being connectable to at least one of the plurality of voting devices, the voting network controller providing control over the plurality of voting devices. The method further comprises coupling the voting devices and the network controller with a communication network; providing a voting network controller display screen including a graphical user interface; and generating a plurality of icons presentable on the graphical user interface, individual icons of the plurality of icons indicative of the presence status of individual ones of the plurality of voting devices when individual ones of the plurality of voting devise are coupled to the communication network.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

The present disclosure provides a variety of voting network configurations and techniques which may be utilized in combination or singularly, as each configuration and technique provides advantageous improvements independent of the use of other configurations and techniques. For, example, in one embodiment, voting network configuration is provided which provides a local voting network having TCP/IP protocol over Ethernet based connections. In another embodiment, a configuration and technique for port blocking security control at a network node is provided. In another embodiment, a configuration and technique for providing connectivity status and alerts between voting terminals and a network controller is provided. Each of these embodiments may be utilized alone or in combination of the others, as this disclosure is not meant to be limited to only a combination of the techniques.

1. Local Voting Network

The present disclosure provides, in one embodiment, a local electronic voting network configured as a daisy chain network having a TCP/IP protocol over Ethernet based connections. On onboard Ethernet switch may be provided at each network node, including within the network controller and each voting terminal. The use of switches throughout the chain allows for improved signal quality and strength. In addition to a switch, at least some of the nodes, for example voting terminals, may include a relay. The relay may be configured such that in case of power down of a node (and/or the node's switch) the relay shunts the Ethernet signal down the network. In this manner, power down, malfunction, interruption, etc. of a particular node does not affect downstream devices.

The techniques disclosed herein may be useful in a wide variety of networked voting systems, and those networks disclosed herein will be recognized as merely being exemplary. As such, the techniques will be recognized to be useful in a wide range of networked voting systems, and not only the exemplary networks shown and described herein.

Figure 1:
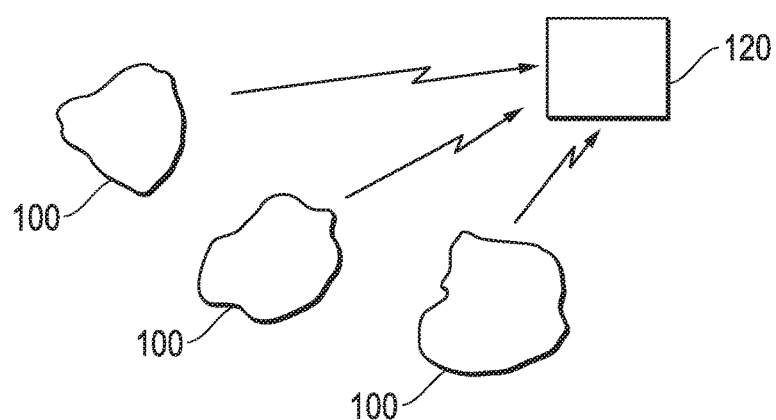
FIG. 1 illustrates exemplary voting networks and a central tabulation center.

FIG. 1 illustrates at a high level one exemplary voting system. As shown in FIG. 1, a plurality of local voting networks 100 are provided. Voting results from the local voting networks 100 may be communicated to a central tabulation center 120. Communication from the networks 100 may occur in a wide variety of manners, including manual transmission (providing an "air gap" such as in the manual movement of data drives from the networks 100 to the central tabulation center 120), hardwire electronic transmission, wireless electronic transmission, etc.

The voting networks 100 may include a variety of voting devices arranged in a variety of manners. For example, the voting networks 100 may each be located at a voting precinct location in which one or more voting terminals are provided. The voting networks 100 may be similarly configured early voting locations. However, it will be recognized that many other voting networks may also be applicable to the techniques disclosed herein, and the configurations and techniques disclosed are not limited to these examples.

Figure 2:
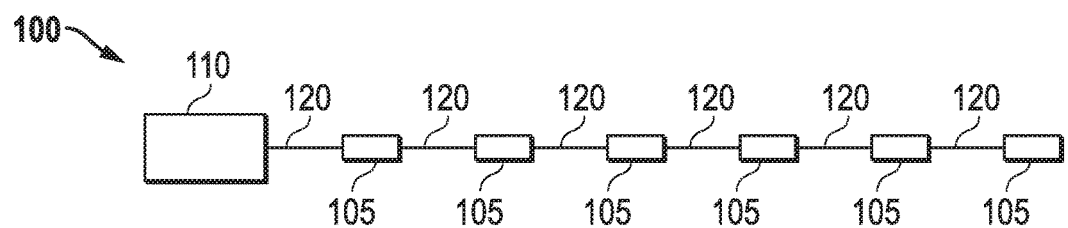
FIG. 2 illustrates an exemplary local voting network.

FIG. 2 illustrates an exemplary local voting network, such as a voting precinct network. As shown in FIG. 2, one or more voting devices 105 are provided. Though six voting devices 105 are shown for merely illustrative purposes, the concepts described herein may be utilized with more or less voting devices. The voting devices 105 may be direct recording electronic (DRE) voting terminals. The voting devices 105 may also be other in-person voting terminals, ballot scanning voting terminals (scanners), etc. that are utilized to document a voter's intent in an electronic network configuration. Networked to the voting devices 105 is network controller 110. The network controller 110 may take the form of one or more of a wide variety of network devices that may be used to control, monitor, and/or implement the voting process of the voting devices 105. For example, the controller may be an election judge's electronic station or computer used at a precinct voting station to provide ballot information to the voting devices and subsequently collect voting records from voting devices. In other embodiments, the controller may also be a server that controls the operations of voting devices. The network controller 105 may be a single integrated unit or may be comprised of a plurality of devices. For example, the network controller may be the combination of one or more of computing devices, keyboards, visual display screens, printers, etc., all of which may be formed integrally in a single unit or all (or some) of which may be separate components electrically connected together.

Hardwire connections 120 may be provided as shown in FIG. 2 between the network controller 110 and the voting devices 105. As described herein, the communications over the hardwire connections may take the form of TCP/IP over Ethernet protocols. It will be noted that though standard Ethernet protocols are described herein, for an added layer of security and voting integrity, the wiring utilized between the devices may or may not be standard Ethernet CAT5/RJ45 wiring. Rather, the physical layer may be obfuscated so as to prevent off the shelf wiring from being used to illicitly tap into the network. Such physical layer obfuscation is described in more detail below. As used herein, "Ethernet" references Ethernet communication protocols whether standard Ethernet cabling or non-standard cabling is utilized between the network nodes.

Figure 3:
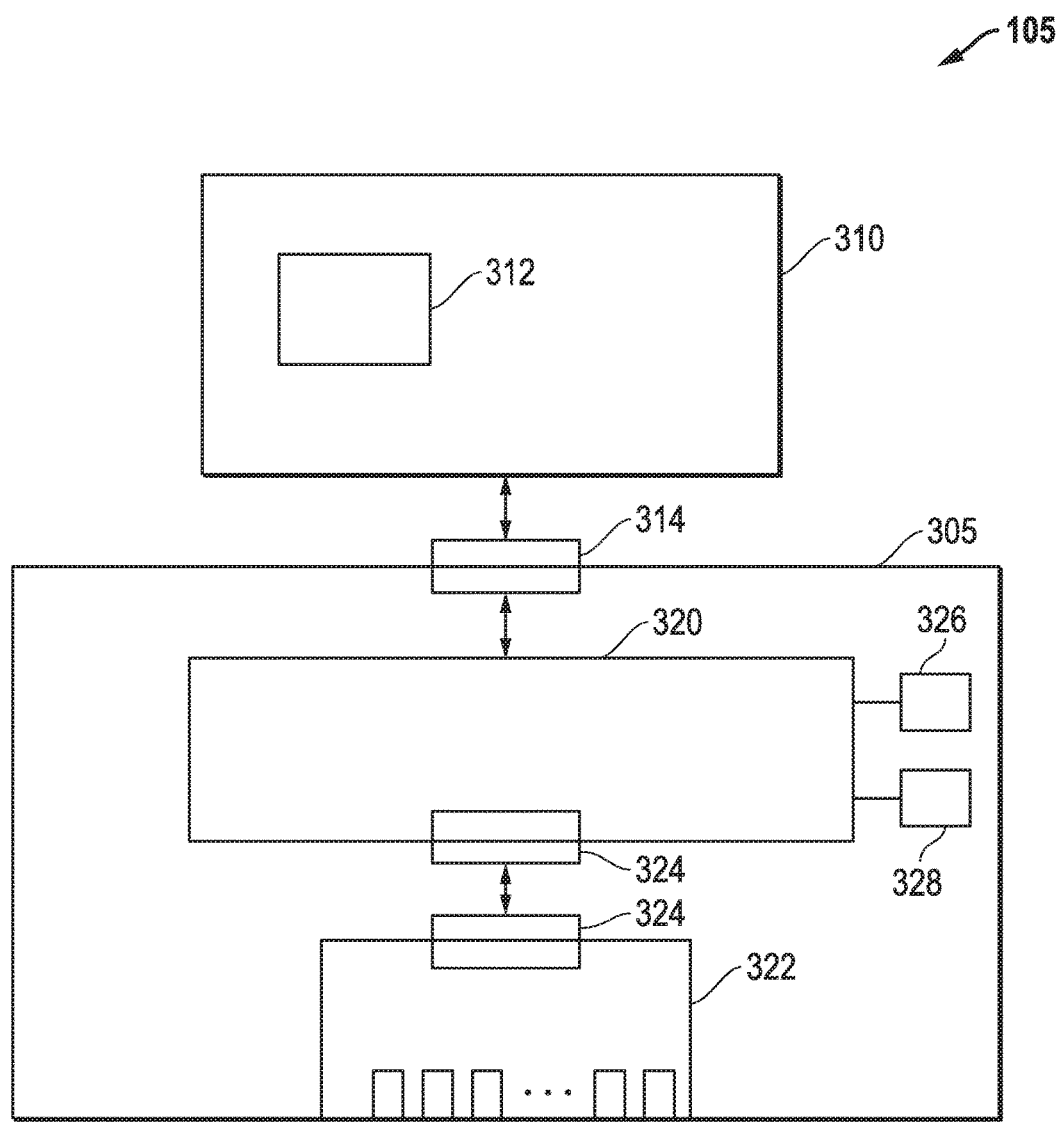
FIG. 3 illustrates an exemplary voting device system design.

FIG. 3 illustrates one exemplary embodiment of a voting device 105 configured as a DRE voting terminal. It will be recognized that other voting devices may be utilized while still utilizing the advantageous techniques disclosed herein. As shown in FIG. 3 the voting device 105 may include a base station 305 and a detachable voting tablet 310. The voting tablet 310 provides the input mechanism through which a voter interacts. The voting tablet may include a touch sensitive screen 312 which provides voting information to a voter and through which a voter provides indications as to the voter's vote choices. The voting tablet 312 may detachably connected with the base station 305 through the use of a docking connection 314. In one embodiment, the communications between the baseboard 305 and the voting tablet 312 may be accomplished through Ethernet and/or USB protocols. However, it will be recognized that many other communication protocols may be utilized. Though described herein with reference to a detachable voting tablet and a touch sensitive screen, it will be recognized that the particular features of the voting tablet may be varied as concepts disclosed herein are not limited to any particular voting tablet. Moreover, it will also be recognized that the concepts disclosed herein are not limited to the use of a voting tablet as the features of the voting tablet may be formed integral within the base station; again, the concepts described herein not being limited to any such particular design configurations of the base station and/or voting tablet.

As shown in FIG. 3, the base station 305 may be partitioned into two main boards (a baseboard 320 and a backpanel board 322) that are connected through board connectors 324. Again, however, such partitioning is merely a design choice and the concepts described herein are not limited by such choices. The baseboard 320 may include a variety of known computing components such as, for example, microcontrollers, power regulation devices, input/output control circuitry, etc. Coupled to the baseboard may be a memory device 326. Memory device 326 may be, in one example, a removable memory drive utilized for storing voting results. Also connected to the baseboard may be a printer 328 such as a thermal printer.

Figure 4:
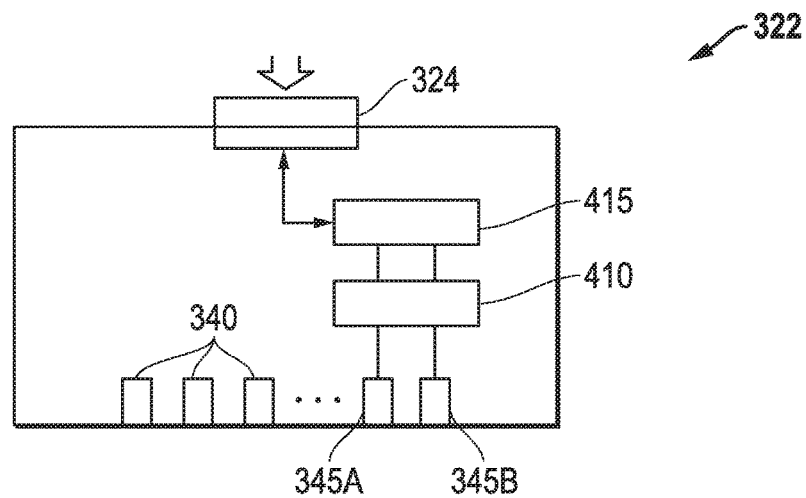
FIG. 4 illustrates an exemplary backplane board.

The backpanel board 322 may include a variety of input/output mechanisms. For example, the backpanel board may input/output mechanisms 340 such as power connections, on-off switches, system status lights, network connectors, etc. The backpanel board 322 is shown in more detail in FIG. 4. As shown in FIG. 4, two of the input/output mechanisms are network connectors 345A and 345B. Though two network connectors are shown, it will be recognized that additional network connectors may be provided. Coupled to the network connectors 345A is a bypass relay circuit 410. The operation of the bypass relay circuit is explained in more detail below. Coupled to the bypass relay circuit 410 is a network switch 415. In operation, network communications may be provided to/from the network connectors 345A and 345B for communication to/from the network switch 415 and to/from the board connector 324. In one embodiment, the network connectors and network switch may be connectors and switches for transmitting Ethernet communications.

For example, the network switch 415 may utilize 10/100 Mbit Ethernet switch technology. In one embodiment, the Ethernet switch may be a five-port Ethernet switch. Two of the ports may be utilized to connect to the network connectors 345A and 345B. One of the ports may be utilized to connect the Ethernet switch 415 to the board connector 324 and the baseboard 320. It will be recognized, though, that the techniques described herein are not limited to the use of Ethernet protocols and other communication protocols may be equally relevant. Thus, other communication protocols may be advantageously utilized in a system having a voting device comprising the connector, relay and switch configuration described herein.

A baseboard such as baseboard 305 of FIG. 4 may also be adapted for use in the network controller 110. Thus, the network controller 110 may include network connectors 345A and 345B and a network switch 415. Bypass relay circuit 410 may also be included within the network controller 110, however, as explained below the functionality of the bypass relay circuit 410 is more directed toward voting terminals 105. In one embodiment the network switch 415 in the network controller 110 may be a five-port Ethernet switch.

The network switches at each device may manage the flow of the data from device to device. Thus, communications from the network controller 110 may proceed through the chain of voting devices until the communication reaches the voting device to which the communication is addressed. The particular relevant switch may then route the communication to the baseboard 320 of the particularly addressed voting device. In this manner, the flow of communications may be controlled through the collection of network switches contained in the network controller 110 and the voting devices 105.

The use of on-board network switches in the network controller 110 and the voting devices 105 advantageously helps ensure strong signal quality and strength verses distance of the total chain of the network. It is noted that due to the high integrity requirements for voting sessions, ensuring the signal quality for the transmission of election data between the network controller and the voting devices is paramount. The inclusion of multiple switches in the network chain helps ensure the signal is propagated in appropriate quality and strength at each hop of the network chain because each switch may retransmit the received signal at full or near full strength. In this manner degradation down the line is minimized, even in the presence of a high number of voting devices 105, because the switching technology propagates the signal with each hop. Thus, the number of devices is not limited by the total length of the daisy chain (cable length plus device-loop-through length), but rather limited by the number of addresses allowed in the switch addressing tables of the switches.

The network configuration described eliminates the need for separate switches to connect network segments, as each voting device and network controller already has an onboard switch. As mentioned above, in one embodiment, the network may be configured as an Ethernet network. Thus, the physical layer of the network may be configured as an Ethernet physical layer. In an exemplary embodiment, upper layers of the network communications may be configured to communicate under TCP/IP protocols, though other protocols would be recognized to be equally applicable. Thus, as described herein, Ethernet switch technology is applied to a daisy chain network configuration for a voting system network, such as a collection of networked DRE voting devices.

Figure 5:
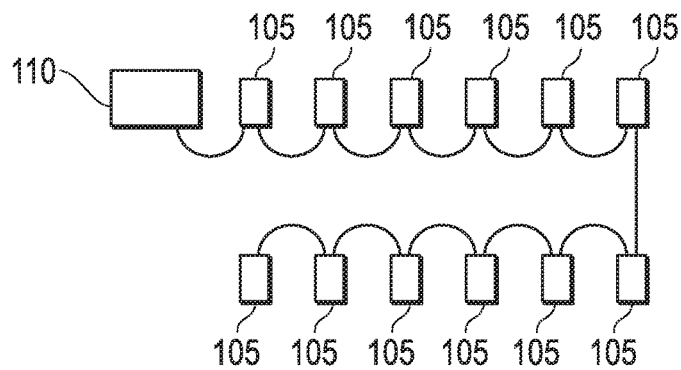
FIGS. 5-6 illustrate exemplary local voting network configurations.
Figure 6:
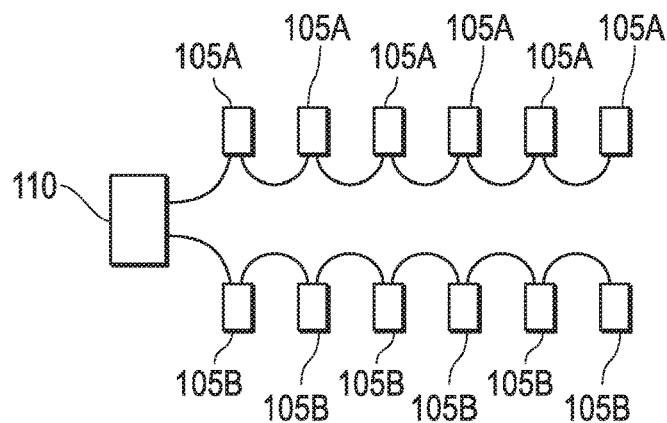

As will be recognized, due to the use of switch technology, the network connectors 345A and 345B are not specifically designated as an input or output (or limited to upstream traffic or downstream traffic). Rather, each connector may allow bidirectional communications. As such, though the network controller 110 may be placed at the "head" of a chain of voting devices 105 such as shown in FIG. 5, the network is not limited to the configuration of FIG. 5. Thus, a network configuration such as shown in FIG. 6 may be utilized. In the configuration of FIG. 6, the network controller 110 is placed "intra-chained" between the voting devices 105A and 105B. In this configuration, one grouping of voting devices 105A may connect to the network controller 110 through one of the network controller's network connectors and a second grouping of voting devices 105B may connect to the network controller 110 through another of the network controller's network connectors. The flexibility of placing the controller 110 intra-chain is advantageous for a number of reasons. First, voting locations (precinct locations, early voting locations, etc.) widely vary in physical layout. The ability of placing a network controller intra-chain greatly increases the flexibility of adapting the physical cabling layout to a particular location. Further, some jurisdictions wish to segregate voting devices by major party. The configuration of FIG. 5 allows the voting devices to be physically arranged in a manner conforming to such requirements. The configuration of FIG. 6 may be considered to be a two pointed star configuration of the daisy chain. Thus, a benefit of using a switching technology that is not directionality based (for example Ethernet) is that the controller may be placed anywhere within the network, effectively splitting the network into multiple directions.

It will be recognized that configurations having more than two branches may be utilized by provision of additional network connectors in the network controller. For example, as discussed above, the network switch in the network controller may be a five port switch. Four ports could thus be utilized for external connections and one port could be utilized to provide communications to the network controller baseboard. In this manner, the configuration could be considered to be a four pointed star configuration of the daisy chain. Though described with relation to a five port switch, it will be recognized that switches may be provided in the network controller that have even more ports. Thus, many other configurations could also be utilized, again only limited by the number of switch ports and/or switch address table limitations. Again, such configurations can greatly enhance the flexibility of accommodating a wide range of physical layouts found at voting locations.

Thus, a voting device network has been described herein that applies network switching technology to a daisy chain of voting devices. The switches help ensure signal integrity down the network chain. In addition, the network may be configured to be multi-directional from the network controller as a result of the use of switch technology. In one embodiment, the physical switch layer may be an Ethernet switch layer.

Returning to FIG. 4, bypass relay circuit 410 is shown interposed between network switch 415 and the network connectors 345A and 345B. Bypass relay circuit 410 provides a mechanism for network connectivity to be maintained amongst the network controller 110 and the voting devices 105 even if a particular voting device 105 malfunctions, loses power or is taken off-line.

Figure 7B:
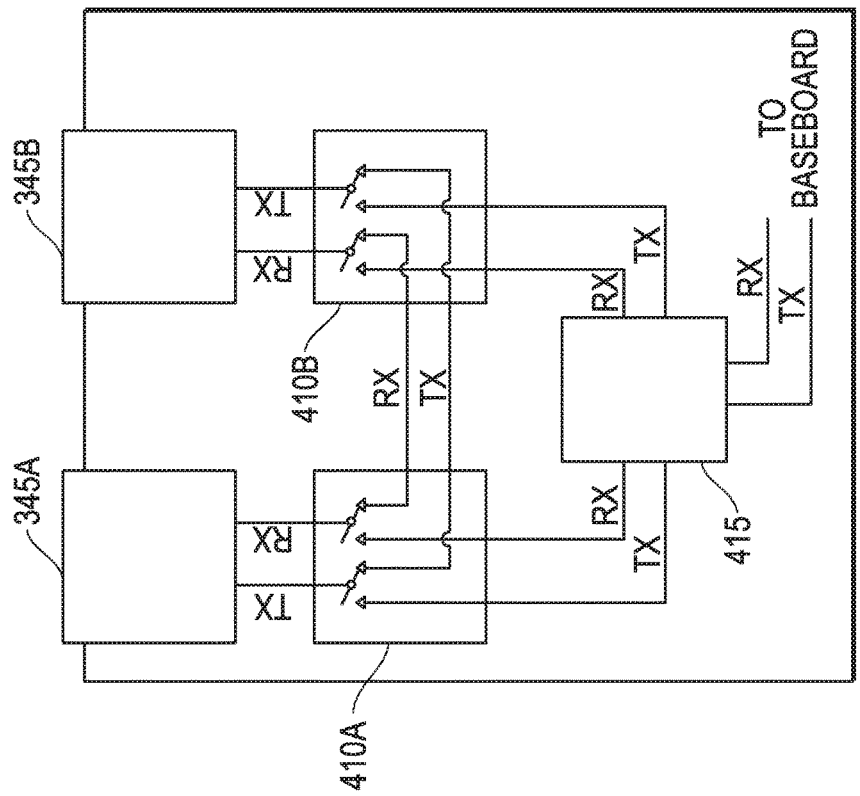
FIGS. 7A and 7B illustrate exemplary backplane board circuitry including relays.
Figure 7A:
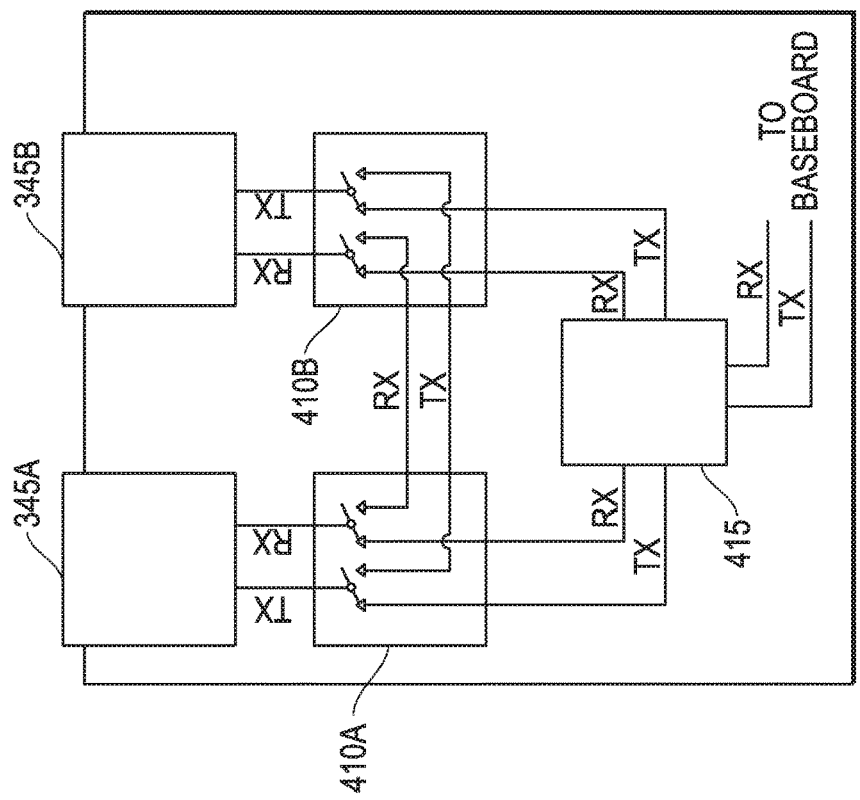

A more detailed view of the connector, relay and switch configuration for a voting device is shown in FIGS. 7A and 7B. FIG. 7A illustrates the normal network operation mode (i.e., the voting device is powered up, online, etc.) and FIG. 7B illustrates the network bypass mode (i.e., the voting device is powered off, malfunctioning, offline, etc.). In the normal operations, network communications would be routed to a voting device's network switch and a determination would be made as to the destination of the communications, and the switch may take the appropriate action (route the communication internal to the voting device, route the communication to the next voting device or both). However, in non-normal operations the network switch may be powered down, malfunctioning, etc. In such cases, it is desirable to continue routing network communications to their appropriate destinations. As described below, the bypass relay circuitry enables such continued routing, even when the network switch of a voting device is not operating (for example during power interruption). The use of relays allows signals to propagate through the network even in the case of power interruption at a voting device.

As shown in FIG. 7A, the bypass relay circuit may be comprised of electro-mechanical relay circuits 410A and relay circuits 410B, together operating as a relay. It will be recognized that relay techniques other than electro-mechanical relays may alternatively be used. In normal operation, switches of the relay circuit are configured to couple transmit and receive paths of the network connectors 345A and 345B to transmit and receive paths of the network switch 415. Thus, as shown in FIG. 7A, the switches are placed in a state that transmits the signals from the network connectors 345A and 345B to the network switch 415. As shown in FIG. 7A, two ports of the voting device's network switch are coupled to the network.

If a voting device in the middle of a daisy chain fails (power loss for example), the network switch 415 will power down. This would normally sever communications up/down the daisy-chain. However, as shown in FIG. 7B the electro-mechanical relays 410A and 410B are configured to close when the power to the backpanel board goes out (either through main power interruption or for other reasons). When the relays 410A and 410B change states, the transmit and receive signals are now coupled between the network connector 345A and 345B as shown. This passes the transmit and receive signals directly between the network connectors, bypassing the network switch. In this manner, the still-functioning systems in the daisy chain can continue to operate, providing fault tolerant operation of the daisy chain network, even when one voting device has failed. Thus, a relay mechanism is provided that ensures that if a device in the middle of the chain is powered down, fails, malfunctions, taken off-network, etc., the interruption of power to the switch does not affect downstream devices. In this manner, the relay 410 shunts the network communications to the other voting devices in the network.

As described above, one exemplary physical layer for use with the network configurations described above is an Ethernet layer. One type of cabling for such physical layers is the CAT 5 twisted pair cable for carrying signals. Network connectors for such physical layers are most typically RJ45 compliant connectors. The network connectors described herein may be RJ45 based connectors. In such embodiments, the cabling and associated connectors may conform to standard off the shelf Ethernet products. However, increased security may be obtained by utilizing connector obfuscation techniques. Thus, though the physical layer may be one type of layer (for example Ethernet), the connectors utilized may be non-traditional connectors. Such obfuscation provides additional security by creating additional barriers for illicit access to the components of the voting network. Thus, for example, though an Ethernet communication configuration is utilized, the cabling and the connectors utilized may not be CAT 5 and RJ45 at the physical layer. The use of non-commercially available connection schemes adds to the overall system security by adding a layer of security at the physical layer. Such obfuscation is known in the voting device art. In this manner, though the communications conform to the Ethernet physical layer, the actual wiring and connector pinouts may be a custom configuration. In one exemplary embodiment, USB 3.0 type connectors provide a connector type for Ethernet transport. Such connectors allow for the Ethernet twisted pairs by running the 100 Mbit Ethernet on the USB 3.0 Super-Speed pairs. Other USB connections may be disabled to ensure the USB devices cannot be coupled to the voting network through the network connectors 345A and 345B. Thus, though one type of physical layer may be utilized for physical network communications, the network connectors and cabling do not have to conform to the standard hardware for such physical layers. In this manner, as used herein, the network may be referenced as one type of physical layer even though the connectors are different. Thus, for example, as described herein, an Ethernet network is provided even though the network connectors are USB 3.0 connectors.

As described above, the voting devices may take any of many forms. In one embodiment, the voting devices may be DRE voting devices. Alternatively, the voting devices may be part of other voting solutions, such as paper-based networked printing and scanner voting systems. It will be recognized that the techniques described herein may be applicable to a wide range of networked voting systems.

2. Port Blocking

Various governmental and jurisdiction regulations for voting systems typically mandate that all external physical input/output (I/O) ports must be physically access protected during storage or transportation to a polling place. As used herein, a physical input/output port and a network connector may both reference the mechanical point of connection between a network node (such as a voting device or a network controller) and network cabling. References to an I/O port include ports that may be input only, output only or both. The governmental and jurisdiction regulations typically require that I/O ports that are unused during a voting session must also remain physically blocked. These requirements are in place to provide added security to the election process, both during equipment transport and during a voting session.

In the various voting network configurations such as shown in FIGS. 2, 5 and 6, the last voting device 105 in a chain need only have one network connector in use and the other network connector (and its corresponding port on the network switch) would not be utilized. Similarly, a network controller 110 may have two network connectors but in the case of the formation of only a single daisy chain (for example FIG. 2 or 5), only one network connector would be needed for use and the other network connector (and its corresponding port on the network switch) would not be utilized. However, due to I/O port physical access protection requirements, the unused I/O port need be access protected.

In one embodiment, the present disclosure provides an input/output port blocker. The port blocker may be comprised of two moveable doors which selectively block one or two input/output ports in a secure manner. The two moveable doors may be coupled to each other such that movement of the first door imparts movement to the second door. The second door may be selectively decoupled from the first door so that the second door may move independent of the first door.

Various embodiments of physical port blocking are shown and described with reference to FIGS. 8-14 in order to provide a solution for such port blocking regulations.

More particularly, the port blocking techniques described herein provide a unique solution to external physical port blocking which takes into account that the voting devices and controllers described herein may include two bidirectional network connectors for input/output ports. Advantageously, the port blocking mechanism described herein accounts for the fact that port usage need not be predefined for a particular network device. Thus, any particular voting device may be the "last in the chain" of the voting devices and a network controller may be configured to receive only a single chain of voting devices. The port blocking techniques described herein provide flexibility for setup of the polling place and the voting network, while allowing an election official to easily unblock one or two ports (or more if additional ports are present).

Figure 8:
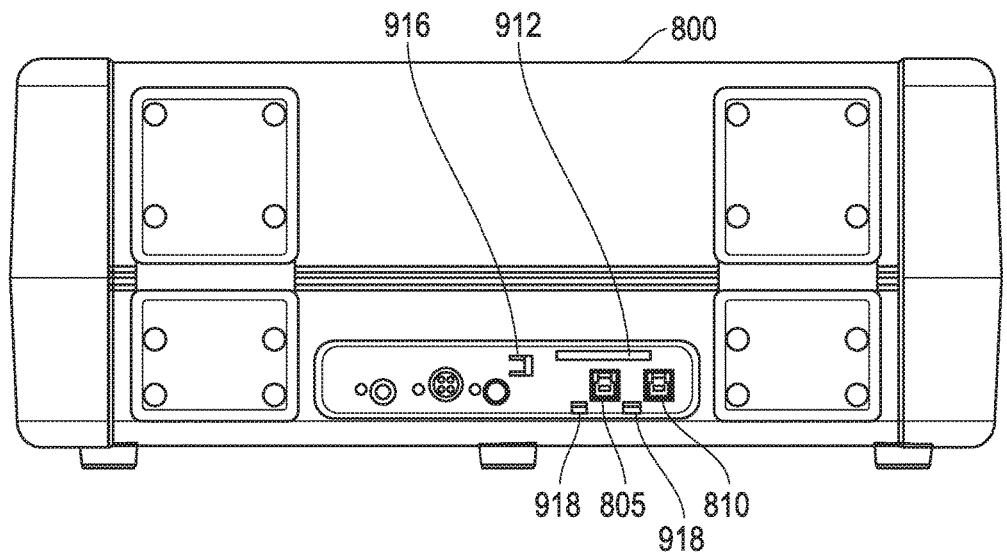
FIG. 8 illustrates exemplary voting network device without port blockers.

FIG. 8 illustrates exemplary network connectors on the rear of a voting network device 800 (for example either a voting device 105 or a network controller 110). As shown in FIG. 8, no port blocking is enabled and the I/O ports (network connectors) are exposed. The example network device 800 has two I/O ports 805 and 810 which may be network connectors 345A and 345B as shown above. It will be recognized that though only two I/O ports are shown, embodiments with more than two I/O ports may be implemented, such as for example, with regard to a network controller which utilizes four ports of a five port multi-port switch to couple to four network connectors which operate as four I/O ports enabling four daisy chains to connect to the network connector. The back of the voting network may include various other mechanisms such as power connection points, on/off switches, reset switches, LEDs that operate as status indicators, etc., all as would be known to those skilled in the art. Also shown in FIG. 8 are strap connector 916, slot 912, and holders 918 which are described in more detail with reference to FIGS. 9 and 10.

Figure 9:
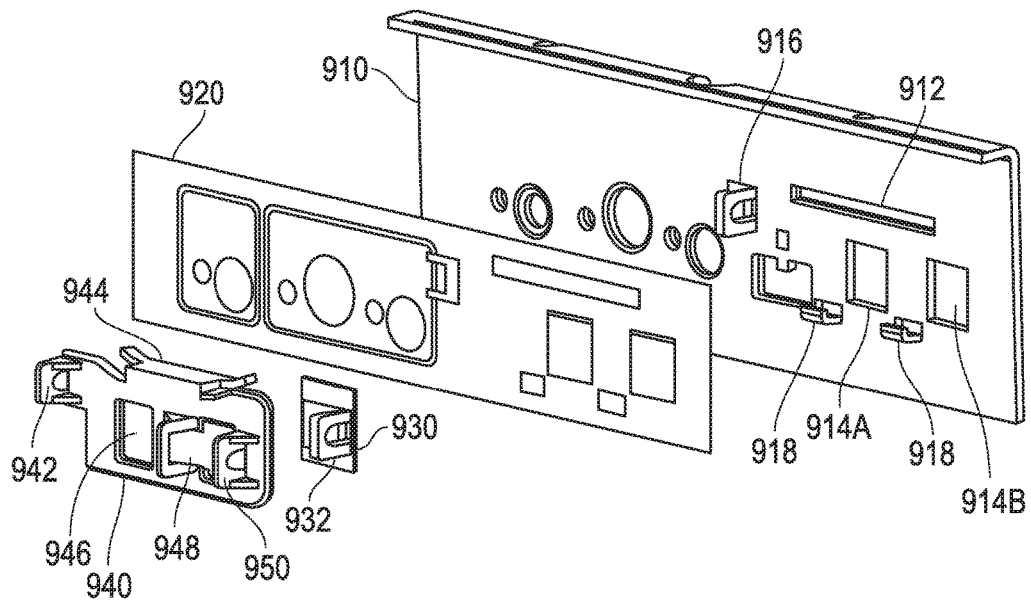
FIGS. 9-10 illustrate an exemplary back plate assembly having sliding doors for use with port blocking.
Figure 10:
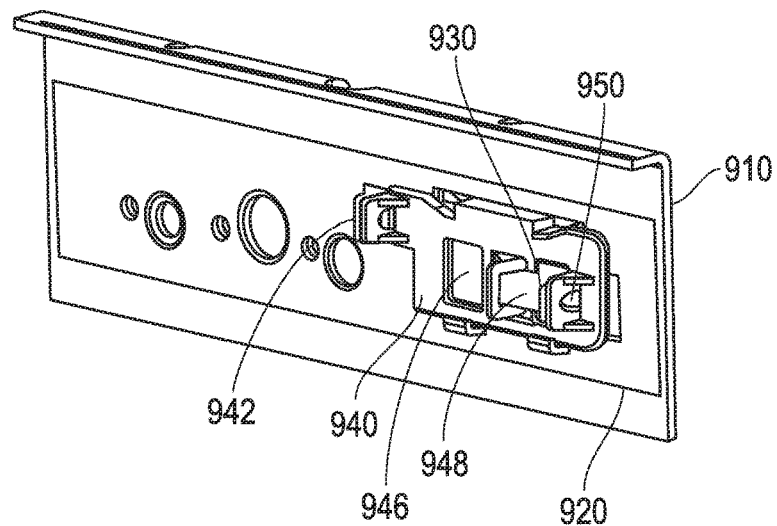

FIGS. 9 and 10 illustrate the back plate assembly for the voting network device 800. FIG. 9 is an exploded view of the sub-assemblies of the back plate and FIG. 10 illustrates the sub-assemblies in an operational view. The back plate assembly includes a back plate 910 which has a slot 912, I/O port openings 914 (914A and 914B), strap connector 916, and holders 918. An intermediate plate 920 is provided with openings that conform to the structures of the back plate 910. An inner door 930 is provided with a strap connector 932. An outer door 940 is provided with strap connectors 942 and 950. An outer door extension 944 is sized to engage with slot 912. In operation, outer door extension 944, slot 912 and holders 918 allow the outer door 940 to slide. The outer door 940 includes openings 946 and 948. In operation, when both I/O ports 805 and 810 are intended to be used, the openings 946 and 948 will align with openings 914A and 914B of the back plate 910 in order to expose I/O ports 805 and 810.

The port blocking techniques described herein allow for securing both I/O ports in a blocked mode, allow for a single I/O port to be open with the other I/O port still secured in a blocked mode, or allow for both I/O ports to be open. The techniques are primarily accomplished by allowing both the inner door 930 and the outer door 940 to be sliding doors. More particularly, the outer door 940 may slide (left to right in the figures) as guided by the engagement of the extension 944 engaged in slot 912 and the holders 918. The inner door 930 may be secured between the outer door 940 and the intermediate plate 920 so as to allow the inner door 930 to slide with the outer door 940. However, the inner door 930 may also slide independently of the outer door in a right to left manner.

In operation, a security strap may be placed through the strap connector 916 of the back plate and the strap connector 942 of the outer door 940. In this mode, the outer door 940 will be secured such that the openings 946 and 948 of the outer door 940 do not align with the openings 914A and 914B of the back plate 910 (and thus not align with the I/O ports 805 and 810). In this manner, use of the security strap with the strap connectors 916 and 942 will securely block both I/O ports. It is noted that a security strap may also be used to strap inner door 930 to the outer door 940 by engaging the security strap through the strap connectors 932 and 950. As is shown in more detail with FIGS. 11-14, the use of a security strap with strap connector 916 of the back plate and the strap connector 942 of the outer door 940 provides port blocking of both I/O ports, independent of whether or not a security strap is used with strap connectors 932 and 950. Thus, no matter what position inner door 930 is in, outer door 940 blocks both I/O ports when outer door 940 is strapped in place.

Though outer door 940 may be used to block both I/O ports, there may be circumstances where it is desirable to unblock one I/O port while blocking a second I/O ports. Such circumstances would typically be encountered in a voting device 105 that is at the "end-of-line" of the daisy chain. In such circumstances, the last voting device in a daisy chain of voting devices only needs network connections made through one of the I/O ports. The second I/O port, being unused, needs to remain blocked though as described above. Likewise, it may be desirable to only unblock one I/O port of a network controller 110 when the network controller is being used in a configuration of a single daisy chain, requiring the other I/O port to remain blocked.

The use of the sliding inner door 930, strap connector 932 and strap connector 950 allows for the blocking of a second I/O port, even when a first I/O port is unblocked by removing a strap at strap connectors 916 and 942. More particularly, operation may follow the steps of: (1) security straps are initially in place at both sets of strap connectors (strap connectors 916 and 942 being one set and strap connectors 932 and 950 being another set) and (2) a security strap is removed from strap connectors 916 and 942 which then allows the outer door 940 to slide left to right. As strap connectors 932 and 950 are still strapped together, the inner door 930 will slide with the outer door 940 from left to right. At this point, a left most I/O port would be exposed through openings 940 and 914A. However, the inner door 930 will provide a physical port block of the openings 948 and 914B. In this manner, one I/O port may be unblocked while a second I/O port remains blocked. If use of the second I/O port is desired, then the security strap engaged at strap connectors 932 and 950 may be broken and the inner door 932 slide right to left. This will expose openings 948 and 914B such that the right most I/O port 810 may now be utilized.

Various states of the straps and doors are shown for illustrative purpose in FIGS. 11-14. In general FIGS. 11-14 illustrate embodiments of using two sliding door assemblies, outer door assembly 940 and inner door assembly 930. Both door assemblies may slide to selectively allow access to a network connector location. The sliding "door within a door", allows either one or two doors to be opened, based on whether one I/O port or two will be utilized.

Figure 11:
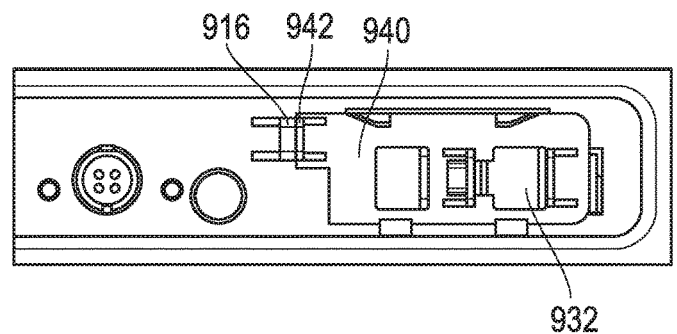
FIGS. 11-14 illustrate differing states of an exemplary port blocking configuration having sliding doors.
Figure 12:
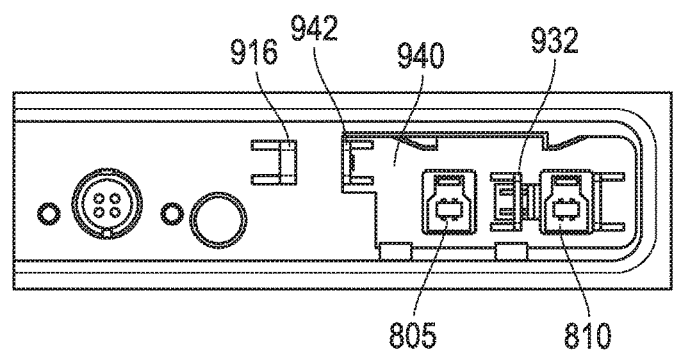

FIGS. 11 and 12 illustrate the door assemblies without any security straps. As shown in FIG. 11, the outer door 940 is slid to the left most position. In this mode both I/O ports are blocked. It is noted that as shown in FIG. 11 the inner door 930 is also slide to the left most position, thus only strap connector 932 is exposed as the other portions of the inner door 932 are behind the outer door 940. Whether inner door 932 is in the left most or right most position, the I/O ports would be blocked in FIG. 11 as the outer door 940 provides port blocking for both I/O ports in the position of FIG. 11. FIG. 12 illustrates an example of both I/O ports 805 and 810 being exposed in a non-blocked mode. As shown in FIG. 12, outer door 940 is slide to right and the inner door 930 (behind outer door 940 except for strap connector 932) is slid to the left most position.

Figure 13A:
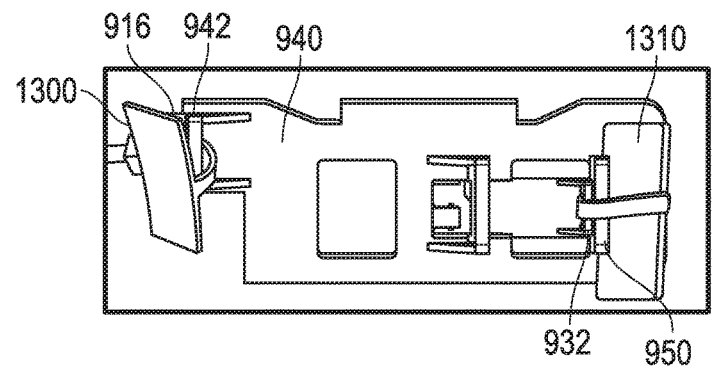
Figure 13B:
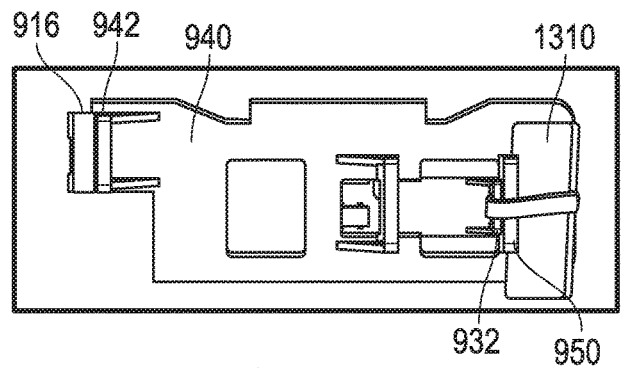
Figure 13C:
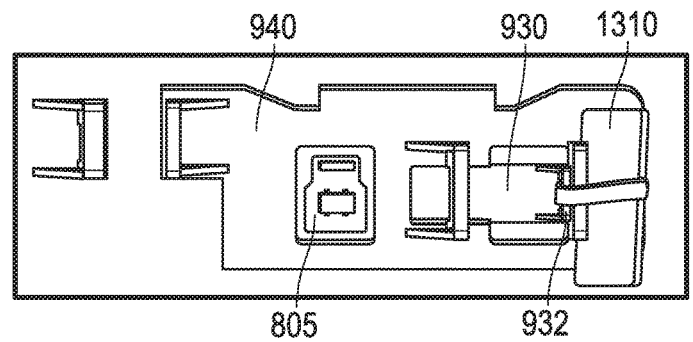
Figure 13D:
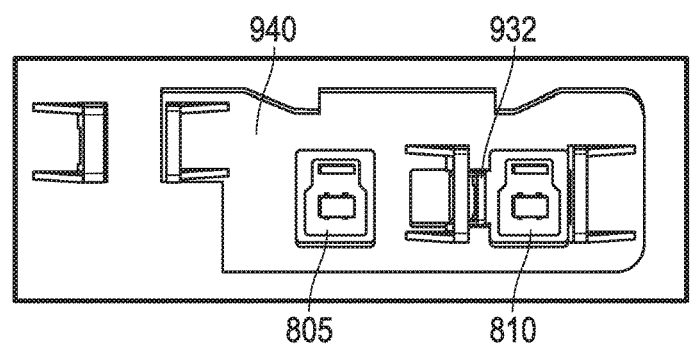

The use of security straps to secure the port blocking mechanisms so that the illicit access to the voting network devices is prevented is shown in FIGS. 13A-D and 14A-C. FIGS. 13A-D illustrate an example of a network device which may be selectively configured to allow only one port to be unblocked or to allow both ports to be unblocked. As shown in FIG. 13A, a security strap 1300 is coupled to strap connectors 916 and 942. This security strap secures outer door 940 in a position that blocks both I/O ports. Security strap 1310 is also coupled to strap connectors 932 and 950 to secure inner door 930. As shown in FIG. 13B, security strap 1300 has been cut and removed. As shown in FIG. 13C, the outer door 940 has been moved to the left most position, exposing I/O port 805. However, because security strap 1310 is still engaged, the inner door 930 slides to the left with the outer door 940. Inner door 930, thus, blocks I/O port 810. As shown in FIG. 13D, the security strap 1310 has been cut and inner door 930 has been slid to the left most position, exposing I/O port 810.

Figure 14A:
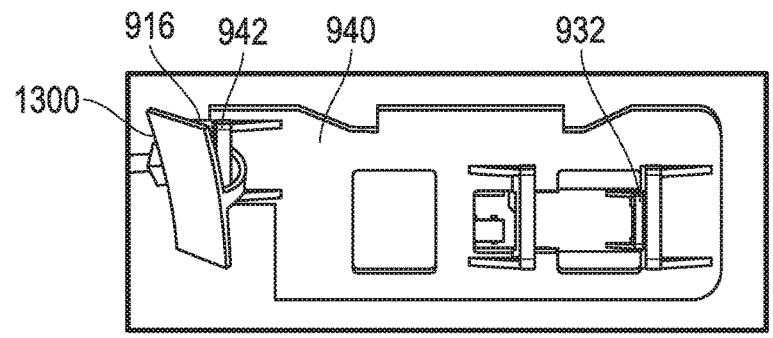
Figure 14B:
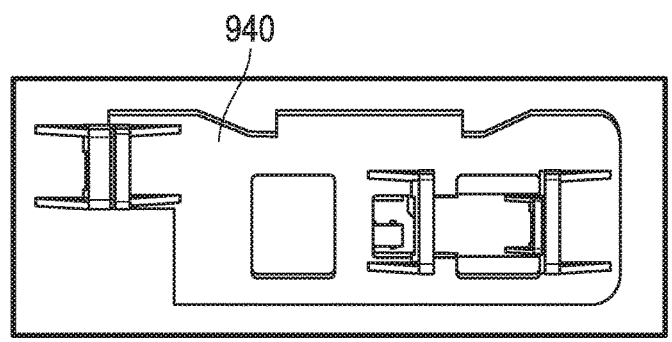
Figure 14C:
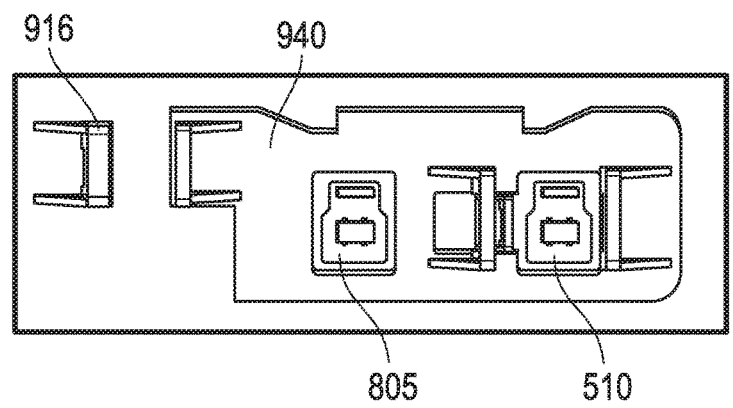

FIGS. 14A-14C illustrates an embodiment in which the port blockers are used for either blocking both I/O ports or allowing access to both I/O ports. The embodiments of FIGS. 14A-14C may be appropriate for a network controller 110 which will control two daisy chains or for use with a voting device 105 which is not located at the "end-of-line" of a daisy chain. As shown in FIG. 14A, the security strap 1300 secures outer door 940 in a position that blocks both I/O ports. In this embodiment, the inner door 930 is not strapped. As shown in FIG. 14B, security strap 1300 has been cut and removed. As shown in FIG. 14C, the outer door 940 has been moved to the left most position, exposing I/O ports 805 and 810. In FIG. 14C, I/O port 810 may be unblocked because inner door 930 was never strapped, thus allowing for the inner door to be slid to an unblocked position.

This port blocking assembly disclosed herein allows configuration at the polling place of the voting device based on either one or two port access requirements. Thus, initially the port blocker assembly may be configured to block both ports of a network controller or voting device (such as during transport of the equipment to a polling place). The port blocker assembly provided allows for a single I/O port to be used and while the other I/O port remains blocked. Alternatively, the port blocker assembly allows for two ports to be unblocked, thus allowing dual port use. It will be recognized that the port blocking techniques described herein could be extended to devices which have more than two I/O ports.

3. Voting Device Status Provided Across Network

The voting network described above enables network communications between the voting devices 105 and the network controller 110. The communications across the network may include a wide range of ballot information as is known in the art, for example ballots may be provided ("served") from the network controller to the voting devices so that the ballot may be loaded on the voting device for execution by a voter. Conversely, cast voting records may be transmitted back from the voting device to the network controller when a voter has completed a ballot. In addition to particular voting communications, the communications may also include status communications which relate to the status of the network, and more particularly, the status of the voting devices. For example, messages may be provided that establish a voting device has been added to the network. Such messages may indicate that synchronization between a voting device and a network controller has begun, that a voting device is synchronized and ready for use, that ballot has been loaded on a voting device, error alerts, power status (power connection status, battery levels), etc. Election officials managing the voting network may then monitor the status of all of the voting devices in the network. Table 1 provides exemplary status messages that may be provided regarding the status of a voting device. It will be recognized that the messages shown are merely exemplary, and other messages may be chosen for use by a system designer.

TABLE 1

| Status Message | Meaning |
| --- | --- |
| Starting | Voting device connected and synching with network controller |
| Not assigned | Voting device needs a booth number assigned |
| Not connected | Voting device was connected, but is no longer communicating |
| Ready | Ready for a voter |
| In use | Ballot is loaded on the voting device |
| Alert | There is an error at the voting device |
| Help Needed | Voter needs help |
| Battery Icon | Displays battery level |
| Plug Icon | Displays whether voting external power is connected |

The network controller may include a screen for monitoring the network status. The various messages regarding the status of the voting devices may be displayed for observation by an election official. In one embodiment, the messages are displayed as part of a graphical user interface (GUI) which allows the election office to monitor the voting network status through the use of graphical icons and/or visual indicators. The GUI provides a simple, convenient and efficient way to display multiple messages simultaneously to an election official in an easy to understand format. In one embodiment, the network controller screen may be a touch screen.

In one embodiment, the present disclosure provides a graphical user interface for use with a network controller. The graphical user interface may be used to display icons which are indicative of the status of various voting devices coupled to the voting network controlled by the network controller. The icons may display multiple levels of information regarding the status of individual voting devices, include (1) the presence of a voting device, (2) whether a voting device is initializing, ready for use or in use and/or (3) any high importance messages regarding a voting device such as error alerts, voting device disconnection or help requests.

Figure 15:
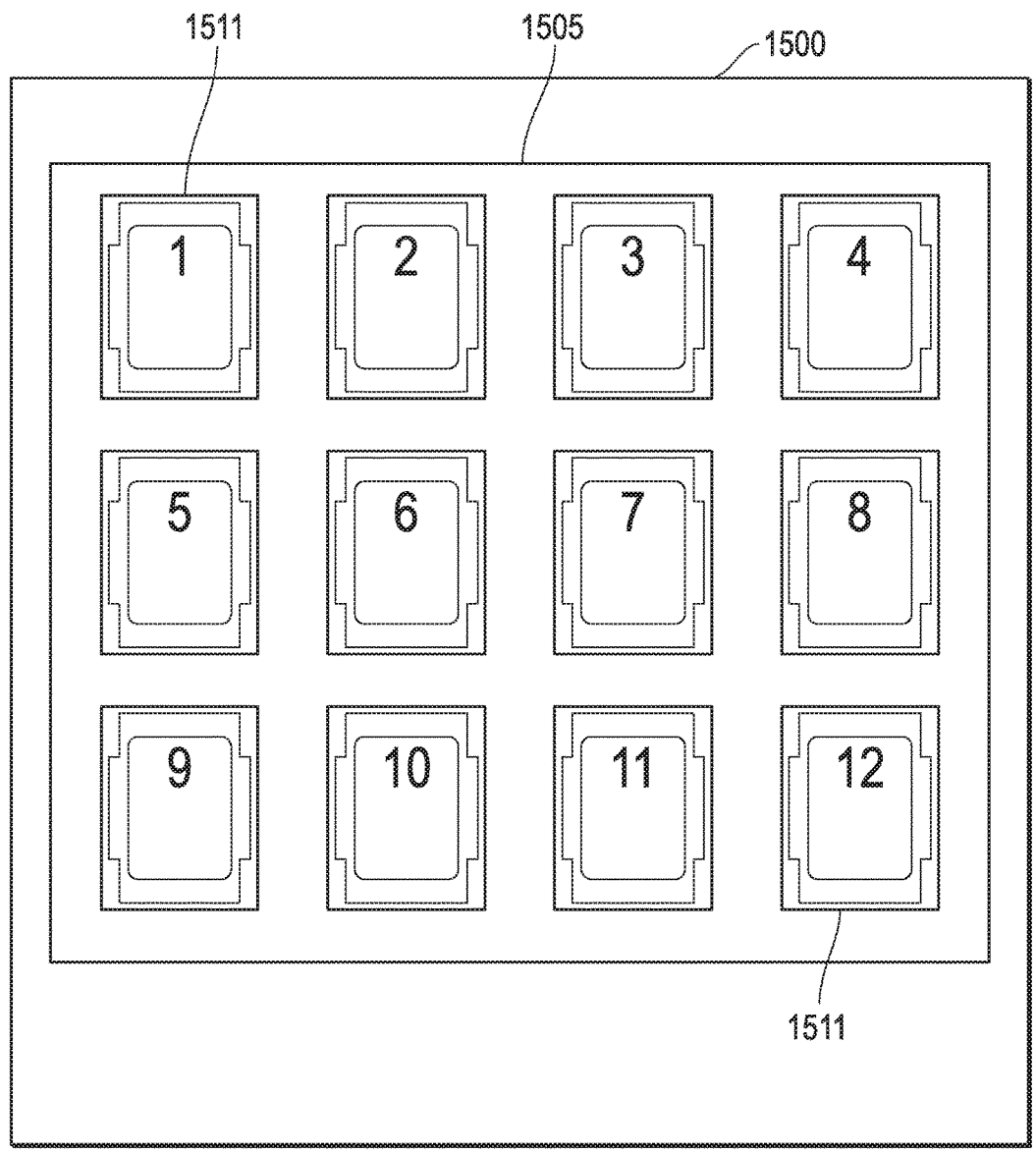
FIGS. 15-21 illustrate exemplary embodiments of a graphical user interface as shown on a network controller display screen.
Figure 16:
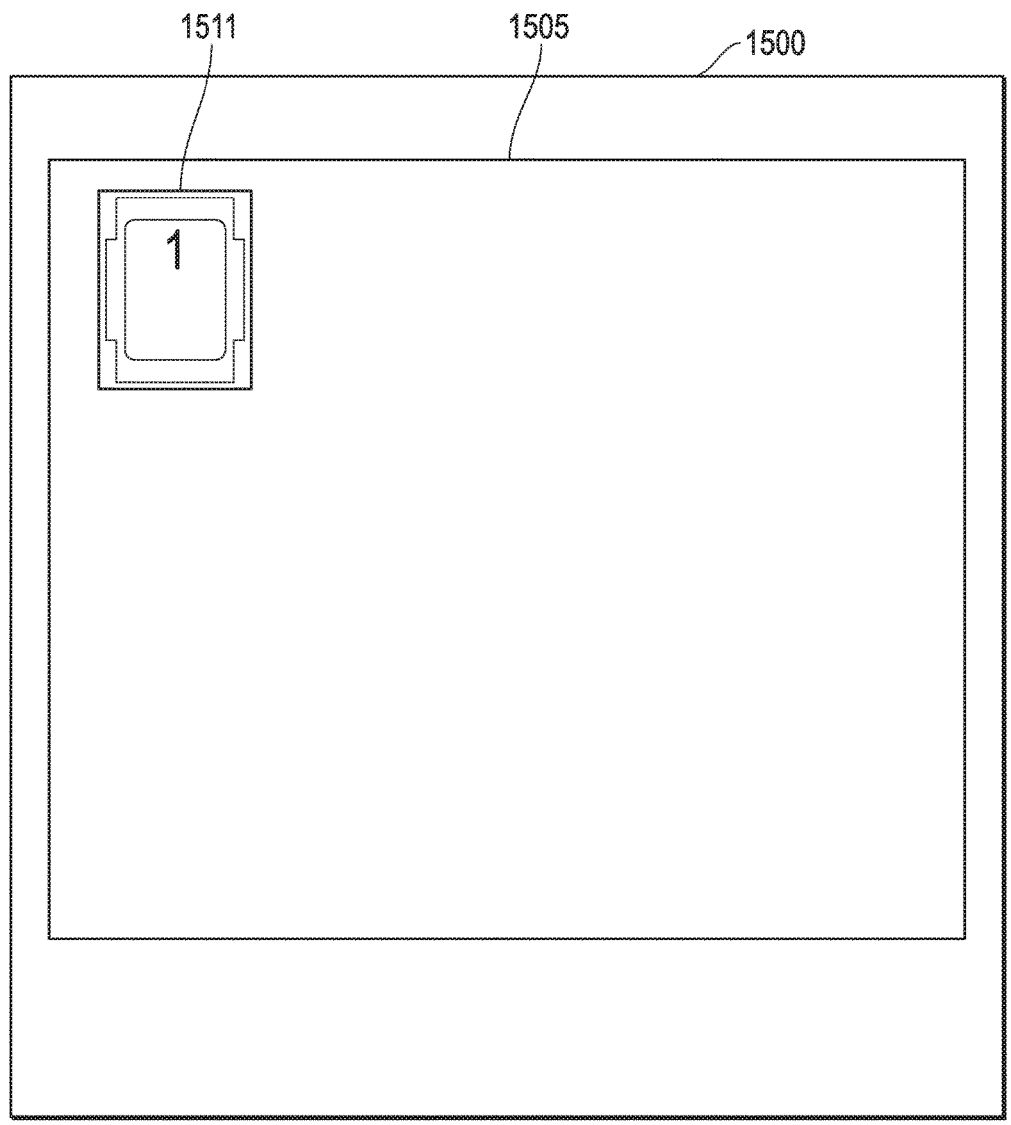
Figure 17:
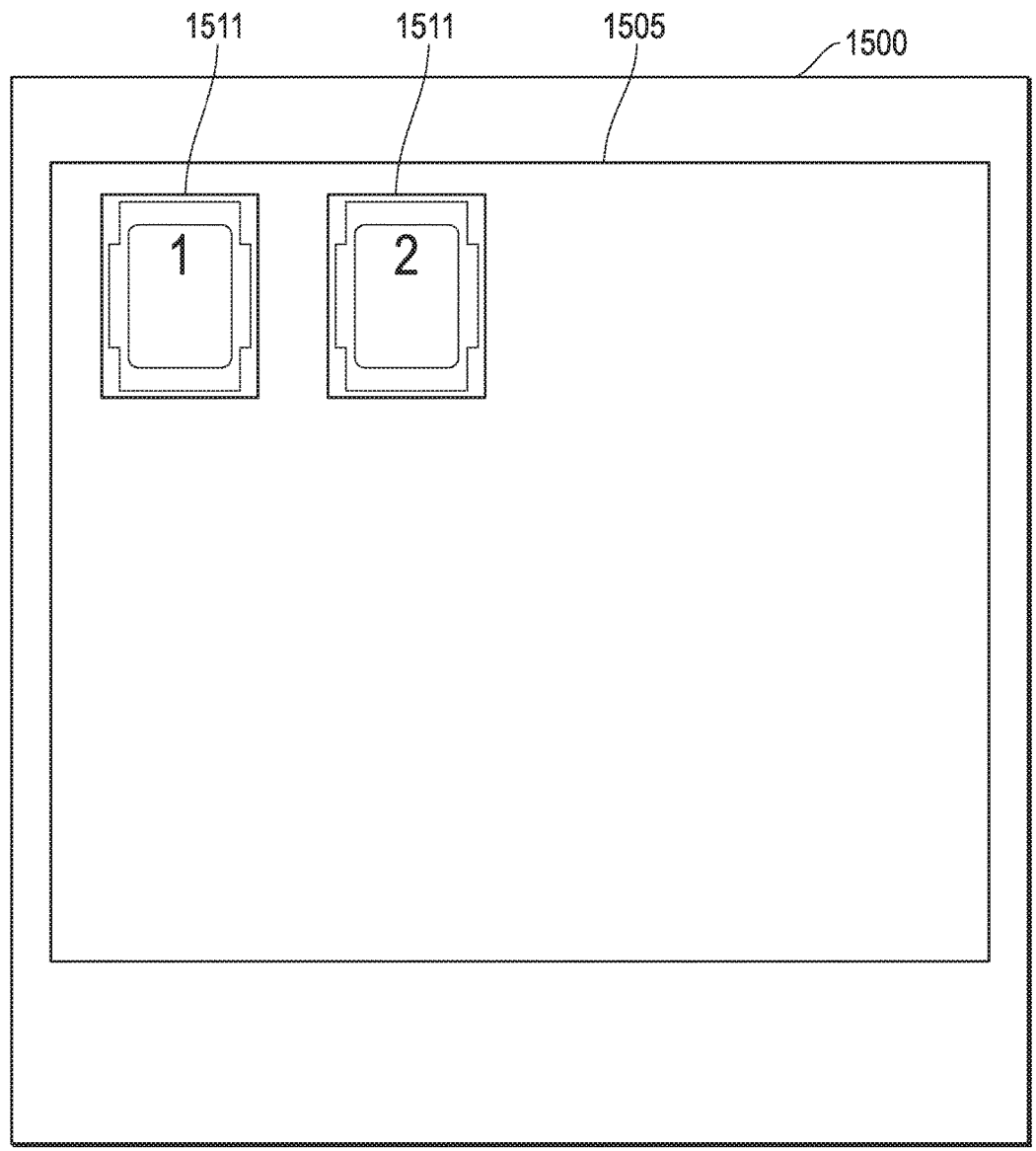

FIGS. 15-21 illustrate network controller screen for displaying a GUI for monitoring a voting network. The screen 1500 of the network controller 110 may include a window for displaying the voting device status. As shown, a plurality of voting device icons 1511 are provided. In the exemplary embodiment, the icons 1511 represent twelve different voting devices of a polling location that are connected to a network controller. In operation, as each voting device is added to a network and a network message is generated regarding such addition, a corresponding voting device icon would be added to the screen 1500 of the network controller. FIG. 16 illustrates a network having one voting device connected (voting device number 1) and FIG. 17 illustrates the network status when two voting devices are connected.

Figure 18:
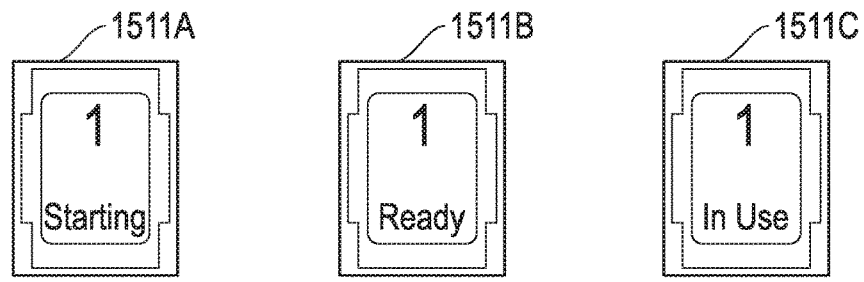
Figure 19:
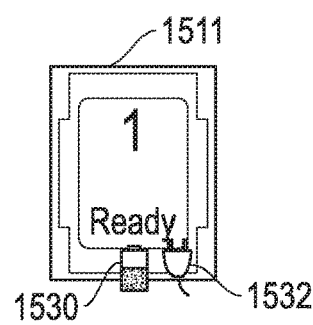
Figure 20:
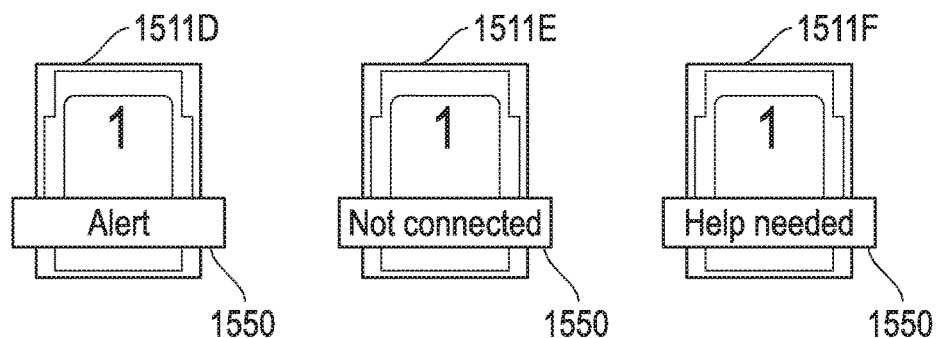
Figure 21:
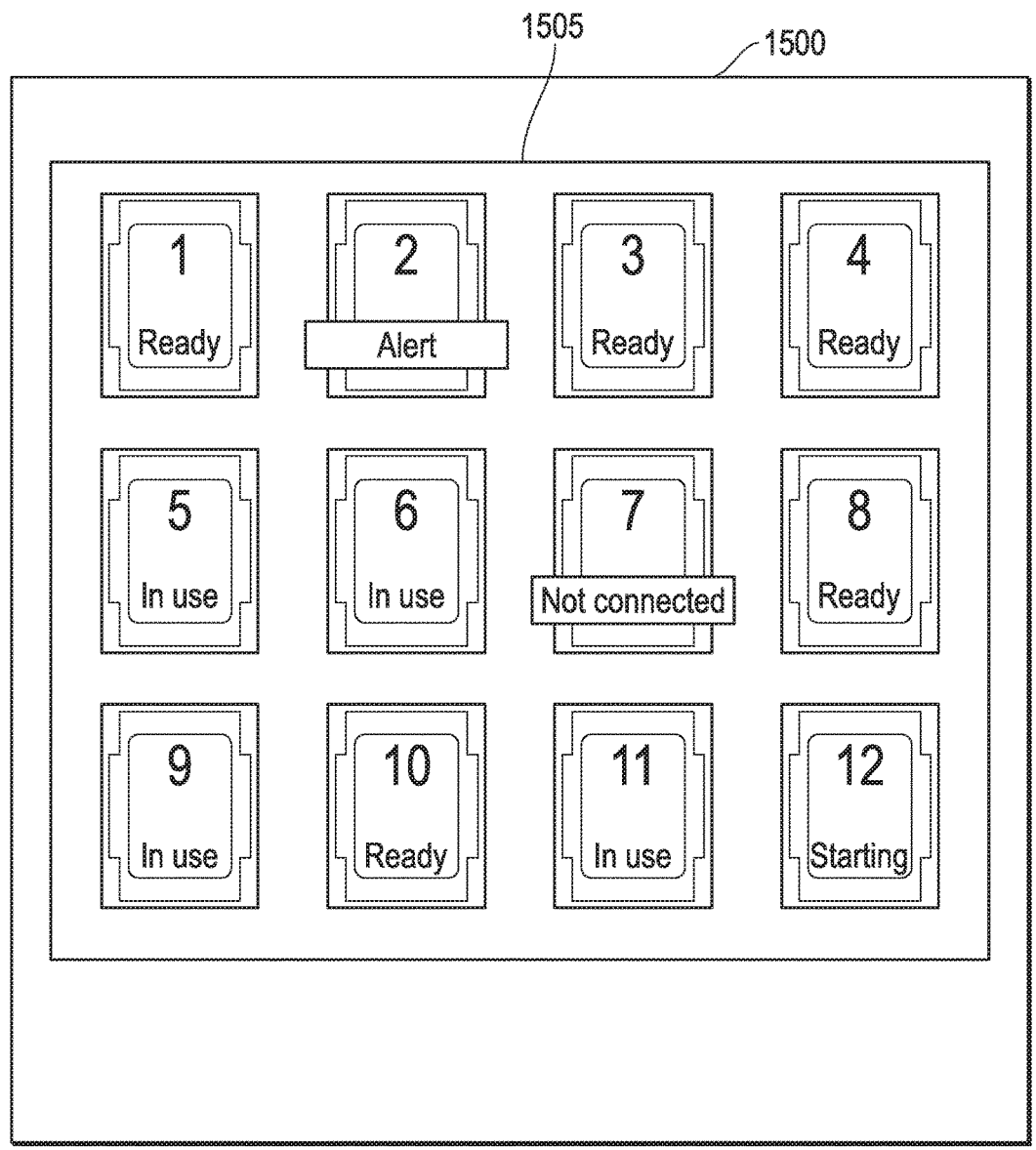

As shown in FIGS. 15-17, the voting device icons present only one "level" or "layer" of information, whether a voting device is connected or not to the network. The icons may be utilized to provide more in-depth messaging to the network controller user. Thus, in addition to the voting device number, other textual commentary may be added to convey the messages of Table 1. FIG. 18 illustrates three example icons providing such additional textual commentary. Voting device icon 1511A indicates that voting device 1 is in a "starting" status. Voting device icon 1511B indicates that voting device 1 is in a "ready" status. Voting device icon 1511C indicates that voting device 1 is in an "in use" status. Though not shown, the voting device icons 1511A, 1511B and 1511C may be implemented in different colors matching each status to further visually emphasize the different status of each voting device. As shown in FIG. 19, battery status information 1530 and power connection status information 1532 may also be added to voting device icon 1511. Finally, some status messages may be considered high importance messages that warrant a distinctive message banner provided across the icon (the banner may also be of another color to further highlight the message). Thus, as shown in FIG. 20, message banners 1550 are provided across the voting device icons. Voting device icon 1511D is provided with the "alert" message banner, voting device icon 1511E is provided with the "not connected" message banner and voting device icon 1511F is provided with the "help needed" message banner. FIG. 21 illustrates an exemplary voting device system status incorporating the concepts described above with regard to FIGS. 15-20. As shown in FIG. 12, the network controller GUI indicates that status of twelve voting devices in a variety of status modes. Thus, some voting devices are "starting," some are "ready," some are "in use," some are in "alert" and some are in "not connected" states.

As shown above, a GUI may provide the status of an entire network of voting devices for simple and efficient evaluation on a display screen of a network controller. Further, status information may be provided in multiple levels or layers of information. For example graphics may indicate the voting devices, embedded text may provide more detailed status information and high importance messages may be overlaid with banners. Thus, three levels of information may be presented to a user for each voting device in one icon.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms and methods of the invention herein shown and described are to be taken as presently preferred embodiments. Equivalent techniques may be substituted for those illustrated and describe herein and certain features of the invention may be utilized independently of the use of other features, all as would be apparent to one skilled in the art after having the benefit of this description of the invention.

What is claimed is:

1. An election voting system network device, comprising:
   a first input/output port, the first input/output port providing a physical connection point for the election voting system network device configured to receive voting network communications;
   a second input/output port, the first input/output port providing a physical connection point for the election voting system network device configured to receive voting network communications;
   a first movable door, the first movable door having at least two positions, in a first position of the first movable door the first movable door blocking the first input/output port and the second input/output port, and in a second position of the first moveable door the first sliding door capable of unblocking at least the first input/output port;
   a second movable door, the second movable door having at least two positions, in a first position of the second movable door the second movable door blocking access to the second input/output port and in a second position of the second movable door the second movable door unblocking at least the second input/output port; and
   wherein the second movable door is configured to be movable as a result of movement of the first movable door, the second movable door being movable between the first position of the second movable door and the second position of the second movable door while the first movable door is in the second position of the first movable door.

2. The election voting system network device of claim 1, the first movable door having two input/output port access holes, the two input/output port access holes configured to align with the first input/output port and the second input/output port when the first movable door is in the second position of the first moveable door.

3. The election voting system network device of claim 2, the second movable door having no input/output port access holes.

4. The election voting system network device of claim 1, the second movable door having no input/output port access holes.

5. The election voting system network device of claim 1, the first movable door being a first sliding door and the second movable door being a second sliding door.

6. The election voting system network device of claim 5, the first movable door having two input/output port access holes, the two input/output port access holes configured to align with the first input/output port and the second input/output port when the first movable door is in the second position of the first moveable door.

7. The election voting system network device of claim 6, the second movable door having no input/output port access holes.

8. The election voting system network device of claim 5, the second movable door having no input/output port access holes.

9. The election voting system network device of claim 1, the first movable door having a first security connector structure configured to allow securing the first moveable door to the election voting system network device, such that the first moveable door is may be secured in the first position of the first movable door.

10. The election voting system network device of claim 9, the second movable door having a second connector structure configured to allow securing the second moveable door to the first moveable door, such that second moveable door may be secured to the first moveable door.

11. The election voting system network device of claim 1, the second movable door having a second connector structure configured to allow securing the second moveable door to the first moveable door, such that second moveable door may be secured to the first moveable door.

12. An election voting system port blocker, comprising:
    a first sliding door configured to provide selective access to a first input/output port and a second input/output port, in a first position of the first sliding door the first sliding door blocking access to both the first input/output port and the second input/output port and in a second position of the first sliding door the first sliding door unblocking the first input/output port; and
    a second sliding door configured to provide selective access to the second input/output port, in a first position of the second sliding door the second sliding door blocking access to the second input/output port and in a second position of the second sliding door the second sliding door unblocking the second input/output port;
    wherein the second sliding door is configured to be selectively coupled to the first sliding door such that, when coupled, movement of the first sliding door causes movement of the second sliding door,
    wherein the first sliding door and the second sliding door may be selectively moved to a variety of positions that selectively (1) block both the first input/output port and the second input/output port, (2) block one of the first input/output port or the second input/output port, or (3) unblock both the first input/output port and the second input/output port.

13. The election voting system port blocker of claim 12, the first sliding door being an outer sliding door and the second sliding door being an inner sliding door.

14. The election voting system port blocker of claim 12, the first sliding door including a location for securing a first security strap.

15. The election voting system port blocker of claim 14, the second sliding door including a location for securing a second security strap.

16. The election voting system port blocker of claim 15, the first sliding door including a location for securing the second security strap, wherein the first sliding door and the second sliding door are configured such that the selective coupling of the first sliding door and the second sliding door occurs when the first sliding door and the second sliding door are in a position for securing the second security strap to both the first sliding door and the second sliding door.

17. The election voting system port blocker of claim 12, the first sliding door having two input/output port access holes.

18. The election voting system port blocker of claim 17, the second sliding door having no input/output port access holes.

19. An election voting system network comprising:
  a plurality of voting devices, the voting devices being network connectable and being configured to process a voter's ballot selections, at least one of the plurality of voting devices having two input/output ports;
  a voting network controller, the controller network being connectable to at least one of the plurality of voting devices, the voting network controller providing control over the plurality of voting devices;
  a communication network coupling the voting devices and the network controller, the communication network being configured as a serial daisy chain connection of the voting network controller and the plurality of voting devices;
  a port blocker assembly coupled to at least one of the plurality of voting devices having two input/output ports, the port blocker assembly comprising:
    a first sliding door configured to provide selective access to a first input/output port and a second input/output port, in a first position of the first sliding door the first sliding door blocking access to both the first input/output port and the second input/output port and in a second position of the first sliding door the first sliding door unblocking the first input/output port; and
    a second sliding door configured to provide selective access to the second input/output port, in a first position of the second sliding door the second sliding door blocking access to the second input/output port and in a second position of the second sliding door the second sliding door unblocking the second input/output port;
  wherein the second sliding door is configured to be selectively coupled to the first sliding door such that, when coupled, movement of the first sliding door causes movement of the second sliding door.

20. The election voting system network of claim 19, wherein each of the plurality of voting devices has the port blocker assembly.

21. The election voting system network of claim 20, wherein the network controller has the port blocker assembly.

22. The election voting system network of claim 19, the first sliding door including a location for securing a first security strap.

23. The election voting system network of claim 22, the second sliding door including a location for securing a second security strap.

24. The election voting system network of claim 23, the first sliding door including a location for securing the second security strap, wherein the first sliding door and the second sliding door are configured such that the selective coupling of the first sliding door and the second sliding door occurs when the first sliding door and the second sliding door are in a position for securing the second security strap to both the first sliding door and the second sliding door.

* * * * *